United States Patent
Hamasaki

(10) Patent No.: US 7,952,310 B2
(45) Date of Patent: May 31, 2011

(54) CONTROLLER OF MULTI-PHASE ELECTRIC MOTOR

(75) Inventor: Masamitsu Hamasaki, Kasugai (JP)

(73) Assignee: OMRON Corporation, Kyoto (JP)

( * ) Notice: Subject to any disclaimer, the term of this patent is extended or adjusted under 35 U.S.C. 154(b) by 327 days.

(21) Appl. No.: 12/266,339

(22) Filed: Nov. 6, 2008

(65) Prior Publication Data

US 2009/0134826 A1 May 28, 2009

(30) Foreign Application Priority Data

Nov. 6, 2007 (JP) ................................. 2007-288038

(51) Int. Cl.
*H02P 27/08* (2006.01)
*G05B 11/28* (2006.01)

(52) U.S. Cl. .................... 318/432; 318/400.01; 318/599; 318/811; 363/41

(58) Field of Classification Search .................. 318/700, 318/400.01, 430, 432, 434, 599, 811; 388/819, 388/820; 363/21.1, 21.11, 21.18, 41, 131; 324/177

See application file for complete search history.

(56) References Cited

U.S. PATENT DOCUMENTS

| | | | | |
|---|---|---|---|---|
| 6,049,474 | A * | 4/2000 | Platnic | 363/98 |
| 6,667,598 | B2 * | 12/2003 | Shimohara | 318/811 |
| 6,735,537 | B2 | 5/2004 | Liu et al. | |
| 6,914,409 | B2 * | 7/2005 | Nukushina | 318/800 |
| 7,119,530 | B2 * | 10/2006 | Mir et al. | 324/76.15 |
| 7,193,388 | B1 * | 3/2007 | Skinner et al. | 318/811 |
| 7,339,394 | B2 * | 3/2008 | De Larminat et al. | 324/765.01 |
| 7,411,369 | B2 | 8/2008 | Maeda et al. | |
| 7,414,425 | B2 * | 8/2008 | O'Gorman et al. | 324/765.01 |
| 2005/0226607 | A1 * | 10/2005 | Williams et al. | 388/819 |
| 2008/0231219 | A1 * | 9/2008 | Mori et al. | 318/434 |
| 2009/0134822 | A1 * | 5/2009 | Hamasaki et al. | 318/400.04 |
| 2009/0146590 | A1 * | 6/2009 | Hamasaki | 318/400.02 |

FOREIGN PATENT DOCUMENTS

| | | |
|---|---|---|
| JP | 10-155278 | 6/1998 |
| JP | 2001-095279 | 4/2001 |
| JP | 2005-531270 | 10/2005 |
| JP | 2007-112416 | 5/2007 |
| KR | 20060103552 A | 10/2006 |

OTHER PUBLICATIONS

Espacenet abstract of Korean Publication No. KR 2006-0103552, Publication date Oct. 2, 2006 (1 page).

* cited by examiner

*Primary Examiner* — Eduardo Colon-Santana
(74) *Attorney, Agent, or Firm* — Osha Liang LLP

(57) ABSTRACT

A controller of a multi-phase electric motor includes a drive section for driving the multi-phase electric motor, a single current detection section for detecting a current value of the multi-phase electric motor, a pulse width modulation signal (PWM) generation section for generating a PWM signal of each phase based on the current value detected by the current detection section and a saw-tooth signal having a predetermined frequency, a current detectability determination section for determining whether or not the current value is detectable in the current detection section based on the PWM signal of each phase generated by the PWM signal generation section, and a switching number determination section for determining whether or not conducting number of the upper arm switching element is an even number or an odd number based on the determination that the current is not detectable by the current detectability determination section.

3 Claims, 11 Drawing Sheets

CONTROLLER OF MULTI-PHASE ELECTRIC MOTOR

BACKGROUND OF THE INVENTION

1. Technical Field

The present invention relates to a pulse width modulation (PWM) drive control of a multi-phase electric motor such as a three-phase brushless motor. In particular, the present invention relates to current detection in a controller arranged with a single current detector between a drive circuit for PWM driving and a direct current (DC) power supply (high voltage side or low voltage side).

2. Related Art

A PWM signal is generated by comparing a carrier wave of saw-tooth shape or triangular shape (saw-tooth signal, triangular signal) and a duty set value corresponding to a target current value in each phase of the multi-phase electric motor. That is, whether the PWM signal is high level or low level is determined depending on whether a value (value of PWM counter) of the saw-tooth signal or the triangular signal is greater than or equal to, or smaller than a duty set value.

When the current detector attempts to measure a current value at a predetermined time in the controller of the multi-phase electric motor for generating the PWM signal based on the saw-tooth signal or the triangular signal and driving the multi-phase electric motor, a time interval in time of switching between one phase and another phase sometimes becomes very small. Since the current is not stable due to the switching time of an electric field effect transistor of the drive circuit, the presence of dead zone (dead time), and also the response delay of an electronic processing circuit, an accurate current cannot be measured during such period.

For instance, when using an A/D converter for the current detector, an accurate current value cannot be detected unless a stable signal is continuously inputted for at least 2 μs due to the specification of the A/D converter. If the input signal is not stably inputted continuously for 2 μs, the A/D converter cannot detect an accurate current value of each phase.

In a vehicle steering device described in Japanese Patent Application Laid-Open Publication No. 2007-112416, a single current sensor for detecting the current value flowing through a current path is arranged on the current path between a motor drive circuit and a ground, and a phase of a saw-tooth wave for generating the PWM signal of each phase is shifted to shift the timing of fall of the PWM signal of each phase to the low level. A value of a U-phase current flowing through the electric motor is then obtained based on an output signal of the current sensor during a period in which a predetermined time has elapsed from when the PWM signal of the V phase fell to the low level. A total current value of the U-phase current and the V-phase current flowing through the electric motor is obtained based on an output signal of the current sensor during a period in which a predetermined time has elapsed from when the PWM signal of the W phase fell to the low level.

In the method of controlling a three-phase or multi-phase inverter described in Japanese Laid-Open Patent Publication No. 10-155278, if the time interval between the switching of a transistor of one phase and the switching of a corresponding transistor of the next phase is smaller than a predetermined threshold value within the PWM period, the measurement is prohibited, the PWM signal defining the measurement time interval of sufficient duration is generated, and the measurement of the influence of switching on a line current becomes possible. The duration of the other PWM signals of the same dependent period is reduced by a certain value, and the sum of reduction of such other PWM signals is obtained to compensate for the amount of increase of the PWM signal defining the measurement interval.

A drive system for a three-phase brushless AC motor described in Japanese Laid-Open Patent Publication No. 2005-531270 is configured to optimize a transistor switching pattern to enhance the power output while enabling the measurement of the current in all phases using a single sensor. This is realized by defining a voltage demand vector x in a case where three or more states are required to satisfy the minimum state time requirement determined by the single sensor method, and calculating the three or more state vectors for generating the request vector x while still allowing the single current detection.

In a method of monitoring a brushless motor capable of compensating some kind of drift in the output signal during the motor operation described in Japanese Laid-Open Patent Publication No. 2001-95279, the current flowing into or flowing out from each winding of the motor is monitored using a current measurement section and an output signal displaying the current is generated, the output of the current measurement section is measured when an instantaneous current flowing through the current measurement section is known to be substantially zero, and a correction output signal for compensating some kind of difference between an actual measurement output signal value and an ideal output signal value is generated.

In U.S. Pat. No. 6,735,537, the triangular signal is used for the carrier wave, terms h phase, m phase, and l phase are used in place of the terms U phase, V phase, and W phase, and the time interval between the h phase and the m phase is represented as t1 and the time interval between the m phase and the l phase is represented as t2. As shown in FIG. 7 of U.S. Pat. No. 6,735,537, the process of Case 2 is performed when the time intervals t1, t2 are both smaller than a threshold value (mw). The process of Case 3 or Case 4 is performed when either one of the time intervals t1, t2 is smaller than the threshold value (mw). In a case of the process of Case 2 (see FIG. 13), the Duty maximum phase is shifted to the left side, and the Duty minimum phase is shifted to the right side (see FIG. 12B). If in a case of the process of Case 3 (see FIG. 15), and determined that only one phase needs to be shifted (N of step 148), the Duty maximum phase is shifted to the left side (see FIG. 14B). If in a case of the process of Case 4 (see FIG. 17), and determined that only one phase needs to be shifted (N of step 166), the Duty minimum phase is shifted to the left side (see FIG. 16B).

SUMMARY

However, in the controller of the multi-phase electric motor for generating the PWM signal based on the saw-tooth signal and driving the multi-phase electric motor, detection of an accurate current value of each phase using the single current detector without changing the duty of each phase is difficult. The details will be hereinafter described but various differences are found between when using the saw-tooth signal and when using the triangular wave for the carrier wave, points to remember regarding the shift method of the phase differ, and handling in the triangular signal cannot be applied as it is. There is also an advantage in that the shift amount is smaller when using the saw-tooth signal than when using the triangular signal.

One or more embodiments of the present invention provides a controller of a multi-phase electric motor capable of generating a PWM signal based on the saw-tooth signal, and detecting the current value of each phase at satisfactory precision using a single current detector.

A controller of a multi-phase electric motor according to one or more embodiments of the present invention includes a drive section, including a pair of upper arm switching element and a lower arm switching element, for driving the multi-phase electric motor; a single current detection section for detecting a current value of the multi-phase electric motor; a PWM signal generation section for generating a PWM signal of each phase based on the current value detected by the current detection section and a saw-tooth signal having a predetermined frequency; a current detectability determination section for determining whether or not the current value is detectable in the current detection section based on the PWM signal of each phase generated by the PWM signal generation section; a switching number determination section for determining whether or not conducting number of the upper arm switching element is an even number or an odd number based on the determination that the current is not detectable by the current detectability determination section; a phase movement section for moving a phase of the PWM signal of a predetermined phase generated by the PWM signal generation section based on the determination result of the switching number determination section and outputting the resultant phase of the PWM signal to the drive section; and each phase current calculation section for calculating a current value of each phase based on the current value detected by the current detection section and the PWM signal of each phase generated by the PWM signal generation section.

Thus, the switching time interval between a predetermined phase, which phase is moved, and another phase becomes large, and the current value of each phase stabilizes, whereby the current value of each phase of the multi-phase electric motor can be accurately detected for every control period using a single current detection section without changing the duty of each phase.

According to one or more embodiments of the present invention, in the controller of the multi-phase electric motor, the phase movement section may move the PWM signal of the predetermined phase in a predetermined movement direction by a predetermined amount when the switching number determination section determines as the even number, and moves the PWM signal of the predetermined phase in an opposite direction to the movement direction by a predetermined amount when the switching number determination section determines as the odd number.

Thus, the switching time interval between the moved predetermined phase and a duty intermediate phase, and between the intermediate phase and the oppositely moved predetermined phase become large, and the current value of each phase stabilizes, whereby the current value of each phase can be accurately detected for every control period using a single current detection section without changing the duty of each phase.

According to one or more embodiments of the present invention, in the controller of the multi-phase electric motor, the phase movement section may move, out of the PWM signals of respective phases, the phase of the PWM signal in which a magnitude of a duty is a maximum in a predetermined movement direction by a predetermined amount, and moves the phase of the PWM signal in which a magnitude of a duty is a minimum in an opposite direction to the movement direction.

Thus, the switching time interval between the phase of the PWM signal in which the magnitude of the duty is a maximum and the intermediate phase, and between the intermediate phase and the phase of the PWM signal in which the magnitude of the duty is a minimum become large, and the current value of each phase stabilizes, whereby the current value of each phase can be accurately detected for every control period using a single current detection section without changing the duty of each phase.

According to the controller of the multi-phase electric motor according to one or more embodiments of the present invention, the switching time interval between the predetermined phase and another phase becomes large by having the phase movement section move the phase of the PWM signal of the predetermined phase by a predetermined amount with respect to the PWM signal generated based on the saw-tooth signal, and the current value of each phase stabilizes during such time interval, whereby the current value of each phase can be accurately detected for every control period using a single current detection section without changing the duty of each phase.

DETAILED DESCRIPTION

Embodiments of the present invention will be described below with reference to the drawings.

Figure 1:
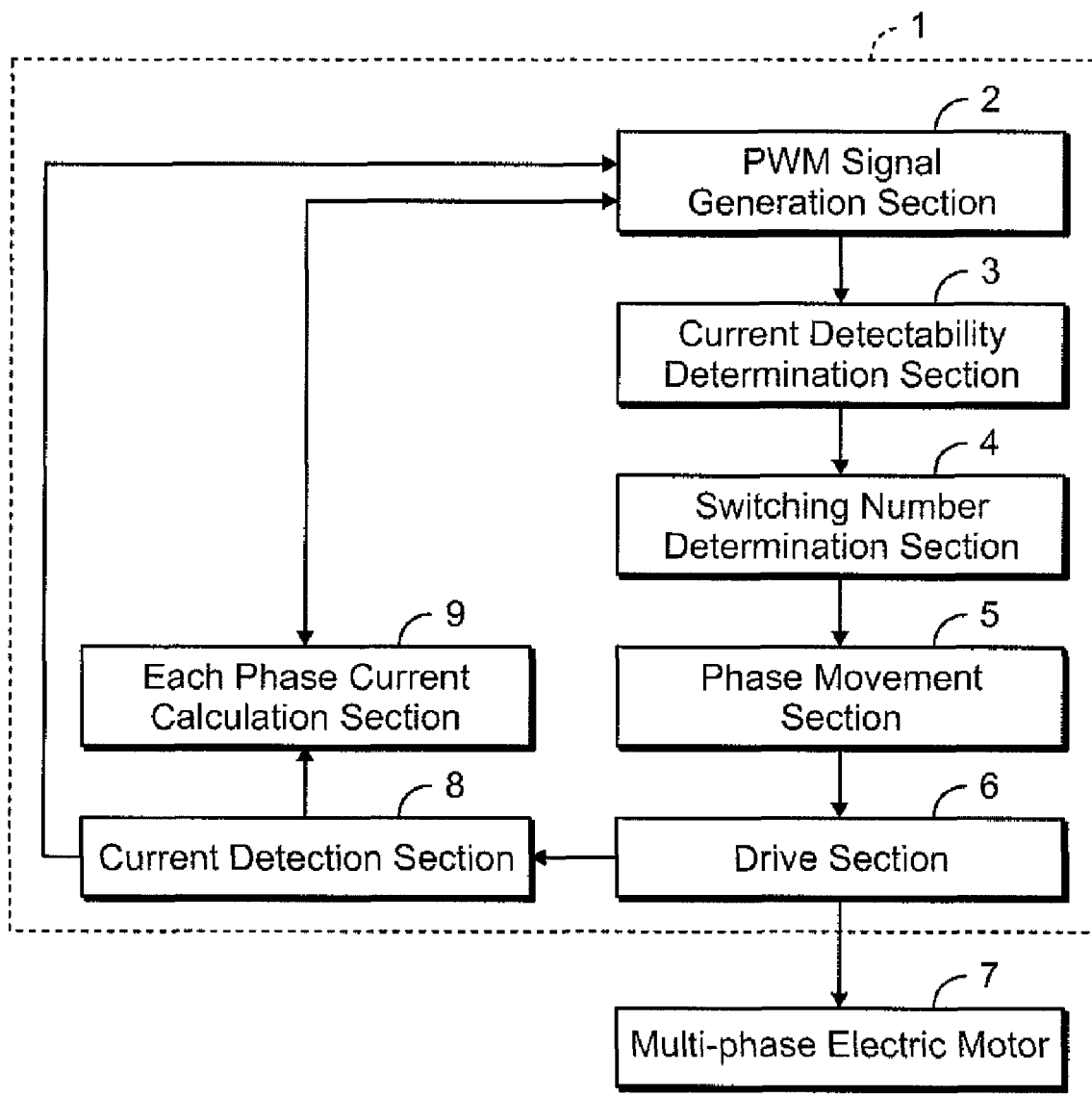
FIG. 1 shows a block diagram of a controller of a multi-phase electric motor according to an embodiment of the present invention.

FIG. 1 shows a block diagram of a controller of a multi-phase electric motor according to an embodiment of the present invention. A controller 1 of a multi-phase electric motor 7 according to the embodiment of the present invention has the following configuration. A drive section 6 is connected between a power supply and a ground, as hereinafter described in the description of a circuit diagram of FIG. 2, includes a pair of upper arm switching element and lower arm switching element, and drives the multi-phase electric motor 7. A current detection section 8 is connected between the drive section 6 and a ground, and detects a current value flowing to the multi-phase electric motor 7 at a predetermined time. A PWM signal generation section 2 generates PWM signal of each phase based on the current value detected in the current detection section 8 and the saw-tooth signal having a predetermined frequency. A current detectability determination section 3 determines whether or not the current value is detectable in the current detection section 8, that is, whether or not there is a switching time interval for an accurate current value to be detected in the current detection section 8 based on the PWM signal of each phase generated in the PWM signal generation section 2. A switching number determination section 4 determines whether the number in which an inner switching element of the three upper arm switching elements is turned ON is when determined that the current is not detectable in the current detectability determination section 3. A phase movement section 5 advances or delays the phase of the PWM signal of the predetermined phase generated by the PWM signal generation section 2 by a predetermined amount based on the determination result of the switching number determination section 4, and outputs the resulting phase of the PWM signal to the drive section 6. Each phase current calculation section 9 calculates the current value of the remaining phase that cannot be directly detected based on the current value detected in the current detection section 8 and the PWM signal generated in the PWM signal generation section 2.

Figure 2:
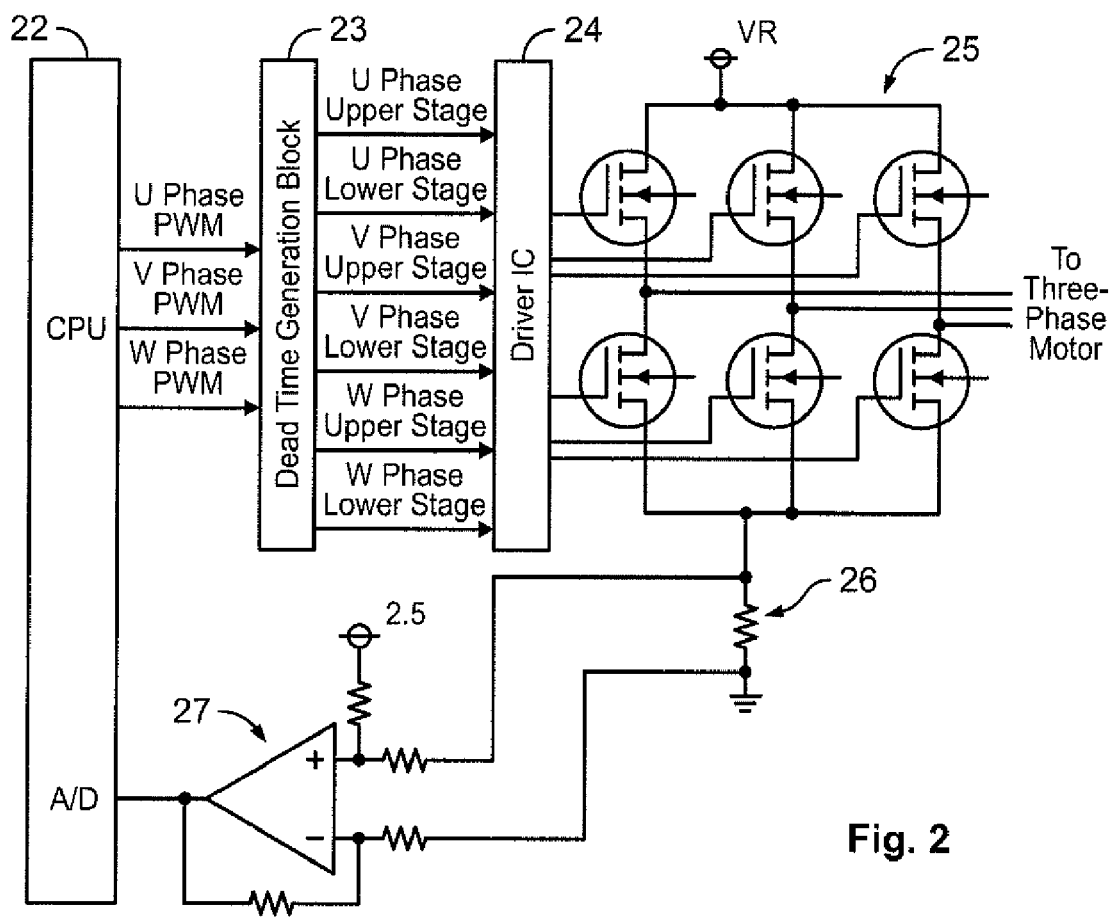
FIG. 2 shows a circuit diagram of the controller of the multi-phase electric motor according to the embodiment of the present invention.

FIG. 2 shows a circuit diagram of the controller 1 of the multi-phase electric motor according to the embodiment of the present invention. A CPU 22 outputs each PWM signal of the U phase upper stage, the V phase upper stage, and the W phase upper stage to a dead time generation block 23. The dead time generation block 23 inputs such signals, provides a slight time interval in which the signals for the upper arm switching element and the lower arm switching element of each phase are turned OFF such that the signals for the upper arm switching element and the lower arm switching element of each phase both are not turned ON for circuit protection, generates each PWM signal of the U phase upper stage, the U phase lower stage, the V phase upper stage, the V phase lower stage, the W phase upper stage, and the W phase lower stage and then outputs the PWM signals to a driver IC 24. A function of the dead time generation block 23 may be realized by software in the CPU 22.

The driver IC 24 inputs such signals to control an FET bridge 25. The FET bridge 25 is connected between a power supply VR and the ground, and includes three pairs of the upper arm switching element and the lower arm switching element. An intermediate part of the three pairs of the upper arm switching element and the lower arm switching element is connected to each phase of the three-phase electric motor. A single shunt resistor 26 is connected between the FET bridge 25 and the ground. The voltage over both ends of the shunt resistor 26 is inputted to an A/D conversion port of the CPU 22 via a current detection circuit 27 including an operational amplifier, a resistor, and the like.

A basic function of the present circuit is as described below. The phase current detection period is 250 μsec, a detection method is two-phase detection/one-phase estimation method, and the PWM mode is a saw-tooth PWM.

In the configuration of FIG. 2, the CPU 22 configures the current detectability determination section 3, the switching number determination section 4, the phase movement section 5, and each phase current calculation section 9 in FIG. 1, the CPU 22 and the dead time generation block 23 configure the PWM signal generation section 2 in FIG. 1, the FET bridge 25 configures the drive section 6 in FIG. 1, and the shunt resistor 26 and the current detection circuit 27 configure the current detection section 8 in FIG. 1. In the present embodiment, the three-phase electric motor is used for the multi-phase electric motor 7 of FIG. 1. The three-phase electric motor is a brushless motor used in an electrical power steering device of the vehicle, and the like.

Figure 3:
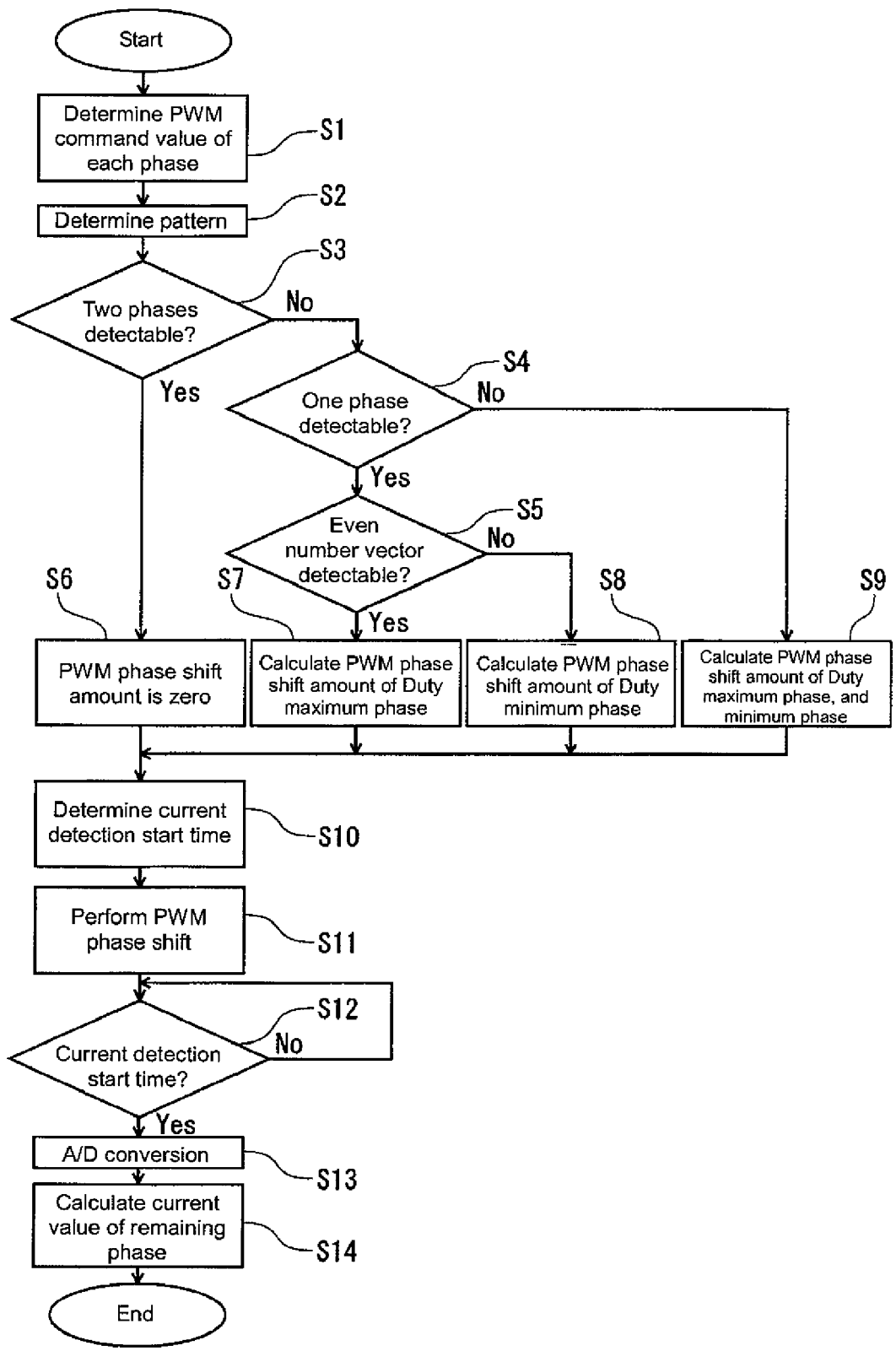
FIG. 3 shows a flowchart of the controller of the multi-phase electric motor according to the embodiment of the present invention.

FIG. 3 shows a flowchart of the controller 1 of the multi-phase electric motor according to the embodiment of the present invention. First, the PWM signal generation section 2 determines a PWM command value of each phase of U, V, and W (S1). As the details will be hereinafter described, pattern determination is performed based on the duty of each phase of U, V, and W (S2). The separation of cases of detectability by the current detectability determination section 3 is then carried out (S3 to S5). First, whether or not two phases of the three phases are detectable is determined (S3). If two phases are not detectable (No in S3), whether or not one phase of the three phases is detectable is determined (S4). If one phase is detectable (Yes in S4), the switching number determination section 4 determines whether an even number vector is detectable (S5). If the even number vector is not detectable (No in S5), an odd number vector is detectable. The even number vector and the odd number vector will be hereinafter described.

The phase movement section 5 then calculates the phase that requires movement and the necessary amount of shift based on the detectability determination condition. First, if two phases are detectable (Yes in S3), the movement is not necessary, and the phase shift amount of each phase of PWM may be zero (S6). If only the even number vector is detectable (Yes in S5), the phase of the phase having a maximum duty is delayed, and the shift amount thereof is calculated (S7). If only the odd number vector is detectable (No in S5), the phase of the phase having a minimum duty is advanced, and the shift amount thereof is calculated (S8). If no phase is detectable (No in S4), the phase of the phase having a maximum duty and the phase of the phase having a minimum duty are both shifted, and the respective shift amount are calculated (S9). After the start time of the A/D conversion for current value detection is determined (S10), the phase movement section 5 performs the PWM phase shift of each phase by the calculated shift amount (S11). The phase shift amount is zero in a case of no PWM phase shift (S6).

The current detection section 8 starts the A/D conversion (S13) when the current detection section 8 reaches the current detection start timing of two locations, to be hereinafter described, (Yes in S12). After the current detection section 8 detects the currents of two phases, each phase current calculation section 9 calculates the current value of the remaining one phase that is not detected based on the Kirchhoff's Law (total of three currents flowing to the three-phase electric motor is zero. In other words, Iu+Iv+Iw=0) (S14).

Table 1 is a table showing PWM pattern determination condition, detectable vector, detected current, detectability determination condition, and detectable timing. Here, w_pwmU, w_pwmV, and w_pwmW respectively show a phase width (duty) of the command value of the U phase, the V phase, and the W phase. These are categorized into six patterns depending on the magnitude relation of the phase widths of the three phases. For example, in a case of w_pwmU≧w_pwmW≧w_pwmV, the pattern is pattern 3 of table 1. In each pattern, the following four cases are considered. In other words, (1) when two phases are detectable
(2) when only odd number vector is detectable
(3) when only even number vector is detectable
(4) when both two phases are not detectable

TABLE 1

| Pattern | Pattern determination condition | Detectable vector | Detected current | Detectability determination condition | Detectable timing |
|---|---|---|---|---|---|
| 1 | w_pwmV ≧ w_pwmU ≧ w_pwmW | (0, 1, 0) Odd | V | w_pwmV − w_pwmU ≧ 12% | U phase lower stage ON - V phase upper stage OFF |
|  |  | (1, 1, 0) Even | −W | w_pwmU − w_pwmW ≧ 12% | W phase lower stage ON - U phase upper stage OFF |
| 2 | w_pwmU ≧ w_pwmV ≧ w_pwmW | (1, 0, 0) Odd | U | w_pwmU − w_pwmV ≧ 12% | V phase lower stage ON - U phase upper stage OFF |
|  |  | (1, 1, 0) Even | −W | w_pwmV − w_pwmW ≧ 12% | W phase lower stage ON - V phase upper stage OFF |
| 3 | w_pwmU ≧ w_pwmW ≧ w_pwmV | (1, 0, 0) Odd | U | w_pwmU − w_pwmW ≧ 12% | W phase lower stage ON - U phase upper stage OFF |
|  |  | (1, 0, 1) Even | −V | w_pwmW − w_pwmV ≧ 12% | V phase lower stage ON - W phase upper stage OFF |
| 4 | w_pwmW ≧ w_pwmU ≧ w_pwmV | (0, 0, 1) Odd | W | w_pwmW − w_pwmU ≧ 12% | U phase lower stage ON - W phase upper stage OFF |
|  |  | (1, 0, 1) Even | −V | w_pwmU − w_pwmV ≧ 12% | V phase lower stage ON - U phase upper stage OFF |
| 5 | w_pwmW ≧ w_pwmV ≧ w_pwmU | (0, 0, 1) Odd | W | w_pwmW − w_pwmV ≧ 12% | V phase lower stage ON - W phase upper stage OFF |
|  |  | (0, 0, 1) Even | −U | w_pwmV − w_pwmU ≧ 12% | U phase lower stage ON - V phase upper stage OFF |
| 6 | w_pwmV ≧ w_pwmW ≧ w_pwmU | (0, 1, 0) Odd | V | w_pwmV − w_pwmW ≧ 12% | W phase lower stage ON - V phase upper stage OFF |
|  |  | (0, 1, 1) Even | −U | w_pwmW − w_pwmU ≧ 12% | U phase lower stage ON - W phase upper stage OFF |

In a case of pattern 3, for example, a case of detecting the odd number vector is a case of detecting the U phase of the three phases, and the detectable vector is (1, 0, 0). This vector represents a state in which the U phase of the upper arm switching element is ON in a first element (1), the V phase is OFF in a second element (0), and the W phase is OFF in a third element (0), where the number of switching element that is ON(1) of the three elements is only one, and thus is an odd number vector. The detectability determination condition in this case is w_pwmU-w_pwmW≧12% when the minimum time necessary for performing the A/D conversion within a period in which the current value is stable is 12% of the 50 μsec period, and the detectable timing is between when the W phase lower stage is ON to when the U phase upper stage is OFF. A case of detecting the even number vector is a case of detecting the −V phase, and the detectable vector is (1, 0, 1). This vector represents a state in which the U phase of the upper arm switching element is ON in a first element (1), the V phase is OFF in a second element (0), and the W phase is ON in a third element (0), where the number of switching element that is ON(1) of the three elements is two, and thus is an even number vector. The detectability determination condition in this case is w_pwmW-w_pwmV≧12% and the detectable timing is between when the V phase lower stage is ON to when the W phase upper stage is OFF. Similar concept can be applied to other patterns, and thus the description other than pattern 3 will be omitted.

If sufficient detection time (e.g., MIN_DUTY=12%) of the current value by the A/D converter cannot be ensured, and an accurate current value cannot be detected since the current value is not stable, the phase is shifted in the following manner for each PWM input signal of the driver IC during the control period (50 μsec×5 periods). When two phases are detectable, the PWM phase shift is not necessary.

Table 2 is a table showing a case where only the even number vector is detectable. If only the even number vector is detectable, the shift is performed as in table 2 to ensure a detectable time in which the current value stabilizes for the two phases. That is, only the Duty maximum phase is shifted to the right side (side for delaying the phase) by the shift amount of MIN_DUTY (12%)-(maximum phase Duty %-intermediate phase Duty %). The shift is not made for the Duty intermediate phase and the Duty minimum phase.

TABLE 2

| Phase | Shift amount | Direction |
|---|---|---|
| Duty maximum phase | MIN_DUTY (12%) − (maximum phase Duty % − intermediate phase Duty %) | Right side |
| Duty intermediate phase | No shift |  |
| Duty minimum phase | No shift |  |

Table 3 is a table showing a case where only the odd number vector is detectable. If only the odd number vector is detectable, the shift is performed as in table 3 to ensure a detectable time in which the current value stabilizes for the two phases. That is, only the Duty minimum phase is shifted to the left side (side for advancing the phase) by the shift amount of MIN_DUTY (12%)-(intermediate phase Duty %-minimum phase Duty %). The shift is not made for the Duty maximum phase and the Duty intermediate phase.

TABLE 3

| Phase | Shift amount | Direction |
|---|---|---|
| Duty maximum phase | No shift |  |
| Duty intermediate phase | No shift |  |
| Duty minimum phase | MIN_DUTY (12%) − (intermediate phase Duty % − minimum phase Duty %) | Left side |

Table 4 is a table showing a case where two phases are both not detectable. If two phases are both not detectable, the shift is performed as in table 4 to ensure a detectable time in which the current values for the two phases stabilize. That is, the Duty maximum phase is shifted to the right side (side for delaying the phase) by the shift amount of MIN_DUTY (12%)-(maximum phase Duty %-intermediate phase Duty %). Furthermore, the Duty minimum phase is shifted to the left side (side for advancing the phase) by the shift amount of MIN_DUTY (12%)–(intermediate phase Duty %–minimum phase Duty %). The shift is not made for the Duty intermediate phase.

TABLE 4

| Phase | Shift amount | Direction |
| --- | --- | --- |
| Duty maximum phase | MIN_DUTY (12%) – (maximum phase Duty % – intermediate phase Duty %) | Right side |
| Duty intermediate phase | No shift | |
| Duty minimum phase | MIN_DUTY (12%) – (intermediate phase Duty % – minimum phase Duty %) | Left side |

Figure 4:
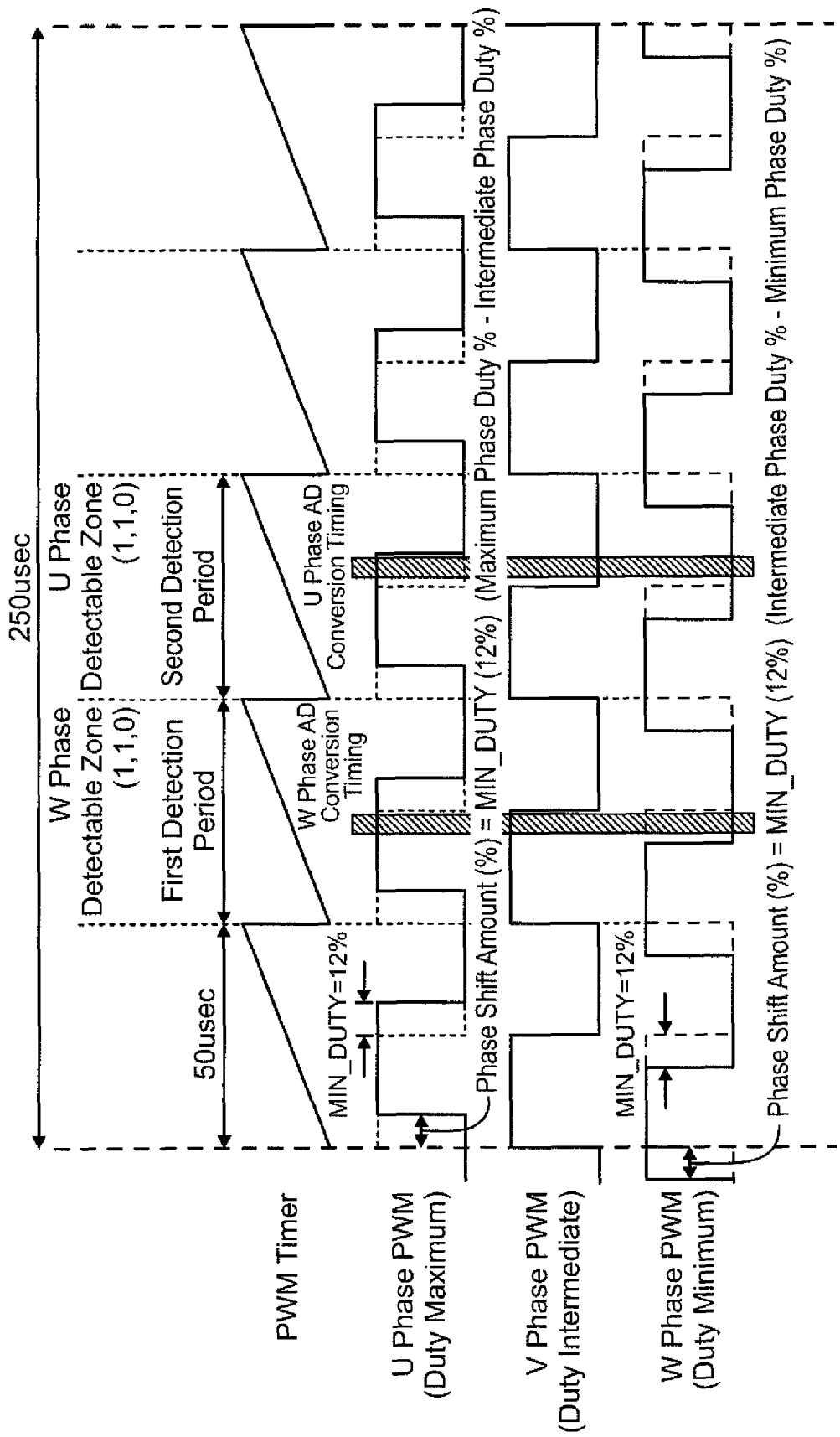
FIG. 4 shows a timing chart showing a brief overview of the controller of the multi-phase electric motor according to the embodiment of the present invention.

FIG. 4 shows a timing chart showing a brief overview of the controller of the multi-phase electric motor according to the embodiment of the present invention. The details will be described in FIGS. 5 to 8.

The control period is 250 μsec, and the configuration thereof includes five periods of PWM signal based on the saw-tooth signal of 50 μsec period. Here, the A/D conversion is performed aiming at the time of the timing in which the current value can be detected in the second and the third PWM period. The second PWM period is noted as a first detection period, and the third PWM period is noted as a second detection period. In this example, the detection is performed in the even number vector state (1, 1, 0) in the first detection period, and the detection is performed in the odd number vector state (1, 0, 0) in the second detection period, but either detection may be performed in either period, and both detections may be performed in the same period.

In the figure, the duties of the three phases are close to each other, where the duty is the maximum in the U phase, the intermediate in the V phase, and the minimum in the W phase. At the current detection timing (AD conversion timing) of the W phase, the U phase takes a high state, the V phase takes a high state, and the W phase takes a low state, and the vector of the switching elements is (1, 1, 0). In other words, the number of switching elements to be turned ON in the upper arm switching elements is an even number. In this case, the current value of the W phase should be detectable without shifting if the switching time interval of the V phase and the W phase is a sufficient length necessary for A/D conversion. However, the accurate current value of the W phase cannot be detected if the time interval of the V phase and the W phase is small.

At the current detection timing (AD conversion timing) of the U phase, the U phase takes a high state, the V phase takes a low state, and the W phase takes a low state, and the vector of the switching elements is (1, 0, 0). In other words, the number of switching elements to be turned ON in the upper arm switching elements is an odd number. In this case, the current value of the U phase should be detectable without shifting if the switching time interval of the U phase and the V phase is a sufficient length necessary for A/D conversion. However, the accurate current value of the U phase cannot be detected if the time interval of the U phase and the V phase is small.

As shown with a solid line, the Duty maximum U phase is shifted to the right side (i.e., delay the phase) by the shift amount of MIN_DUTY (12%)–(maximum phase Duty %–intermediate phase Duty %) to ensure the phase difference 12% for detecting the accurate current value at the respective timing. The Duty minimum W phase is shifted to the left side (i.e., advance the phase) by the shift amount of MIN_DUTY (12%)–(intermediate phase Duty %–minimum phase Duty %). The Duty intermediate V phase is not shifted. Similar shift process is performed in the five periods.

The A/D conversion is performed at the detectable timing in which the current of two phases of the U phase, which is the Duty maximum phase, and the W phase, which is the Duty minimum phase, can be detected. That is, in a case of the current detection of the Duty minimum W phase, the A/D conversion is performed from the time point where the current value is stabilized until immediately before the fall of the PWM signal of the Duty intermediate V phase after the fall of the PWM signal of the W phase during the first detection period (shaded portion on the left side). In a case of the current detection of the Duty maximum U phase, the A/D conversion is performed from the time point where the current value is stabilized until immediately before the fall of the PWM signal of the U phase after the fall of the PWM signal of the V phase during the second detection period (shaded portion on the right side).

Figure 5:
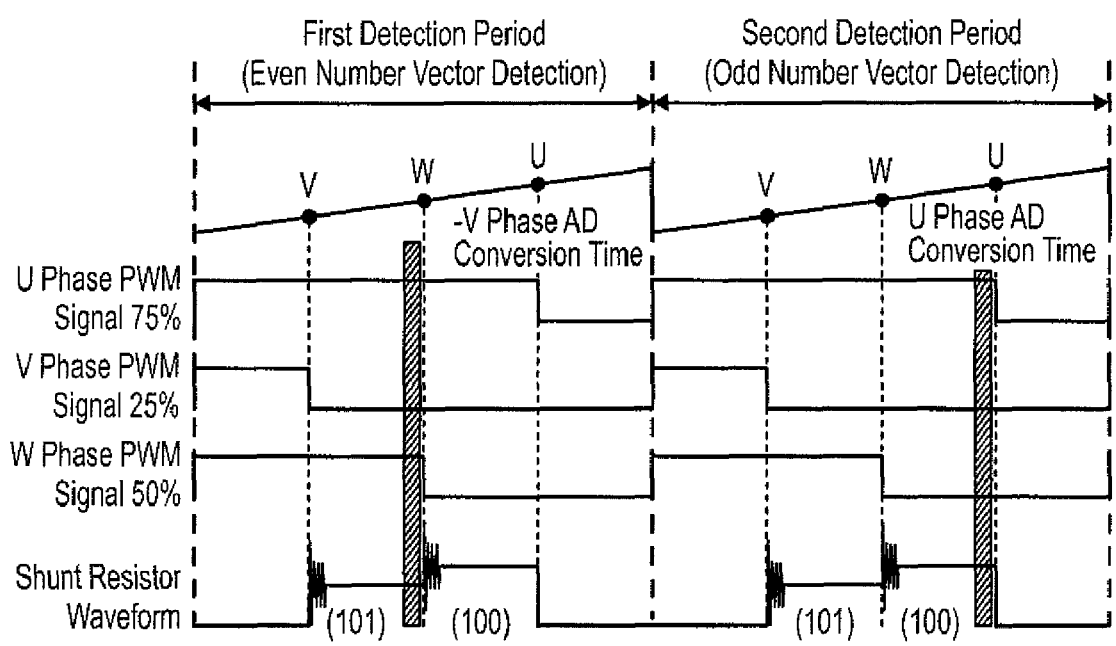
FIG. 5 shows a timing chart in a case where two phases are both detectable.

FIG. 5 shows a timing chart in a case where the two phases are both detectable. In the first detection period (even number vector detection period), the switching time interval of the V phase (duty 25%) and the W phase (50%) is sufficiently large. Thus, an accurate current value can be detected in such time interval (vector in this case is (1, 0, 1)). In the second detection period (odd number vector detection period), the switching time interval of the U phase (75%) and the W phase (50%) is large. Thus, an accurate current value can also be detected in such time interval (vector in this case is (1, 0, 0)). Therefore, shift does not need to be performed.

Figure 6A:
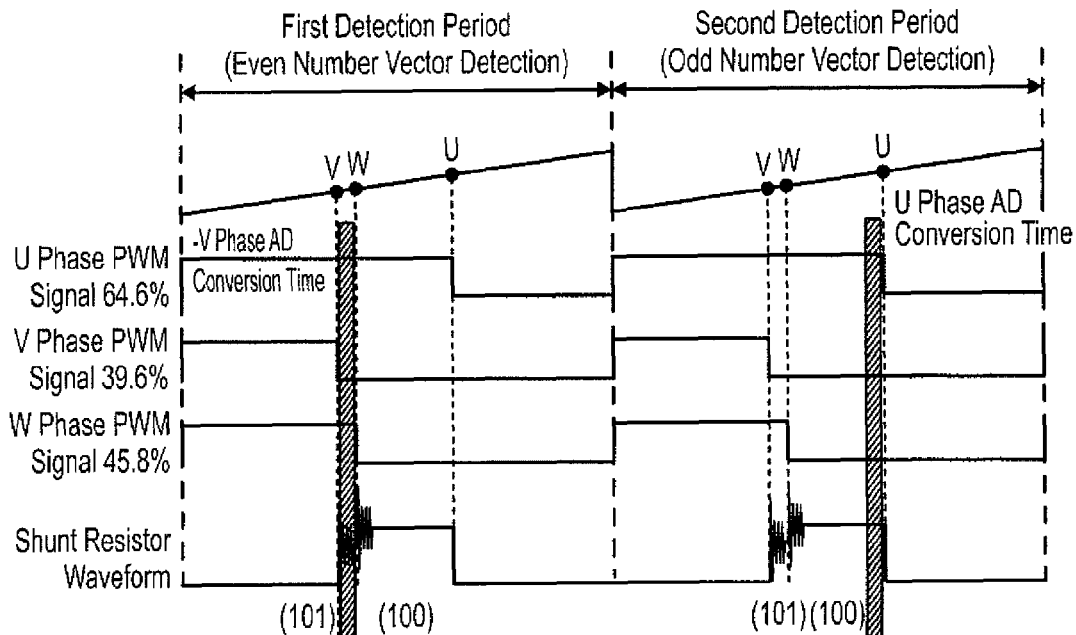
FIGS. 6A and 6B show a timing chart in a case where only an odd number vector is detectable.

FIG. 6A shows a timing chart in a case where only the odd number vector is detectable. In the first detection period (even number vector detection period), the switching time interval of the V phase (duty 39.6%) and the W phase (45.8%) is small. Thus, an accurate current value of the V phase cannot be detected in such time interval. In the second detection period (odd number vector detection period), the switching time interval of the U phase (64.6%) and the W phase (45.8%) is large. Thus, an accurate current value of the U phase can be detected in such time interval.

Figure 6B:
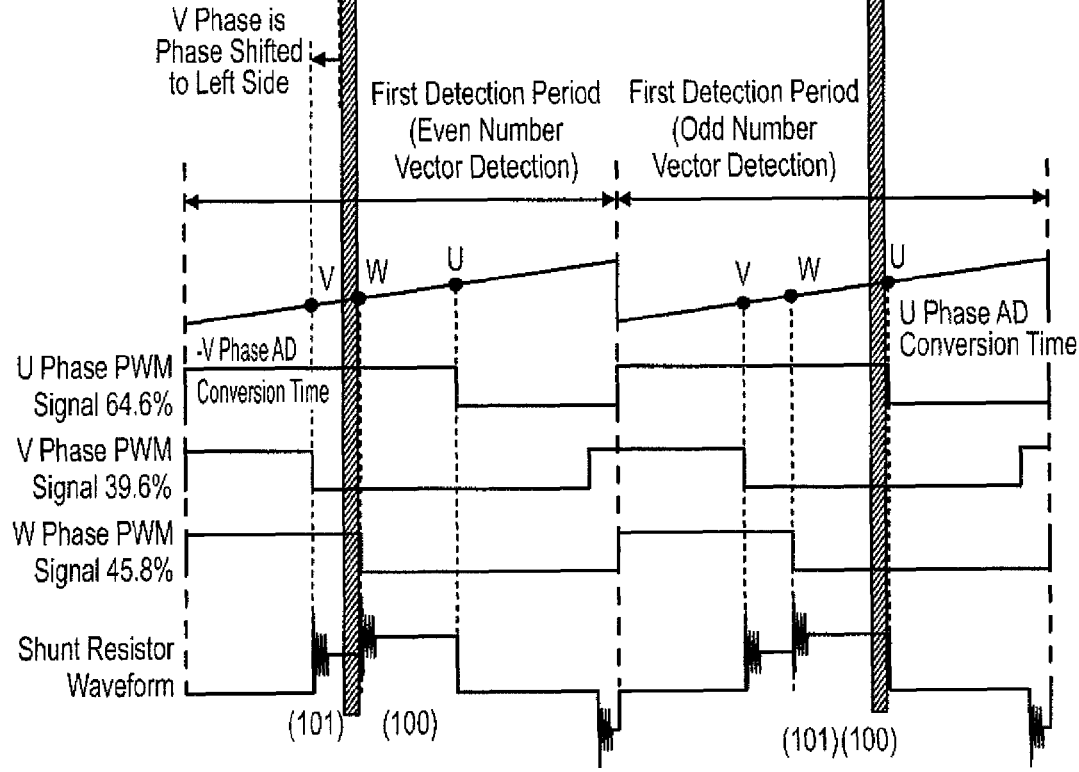

In other words, in the first detection period (even number vector detection period), the PWM signal of the V phase having the minimum duty of the three phases is phase shifted to the left side (to advance the phase) as shown in FIG. 6B since an accurate value of the V phase cannot be detected in a state of even number vector, that is, in a state of (1, 0, 1) in this case. The switching time interval of the V phase and the W phase thereby becomes large. The accurate current value of the V phase then can be detected in the A/D converter since the current value stabilizes. In the second detection period (odd number vector detection period), the switching time interval of the U phase and the W phase is large even after the phase shift of the V phase. Thus, an accurate current value of the U phase can be detected in such time interval.

In a case of the current detection of the V phase having the minimum Duty, the A/D conversion is performed from the time point where the current value is stabilized to immediately before the fall of the PWM signal of the Duty intermediate W phase after the fall of the PWM signal of the V phase during the first detection period (shaded portion on the left side). In the case of the current detection of the Duty maximum U phase, the A/D conversion is performed from the time point where the current value is stabilized until immediately before the fall of the PWM signal of the U phase after the fall of the PWM signal of the W phase during the second detection period (shaded portion on the right side).

Figure 7A:
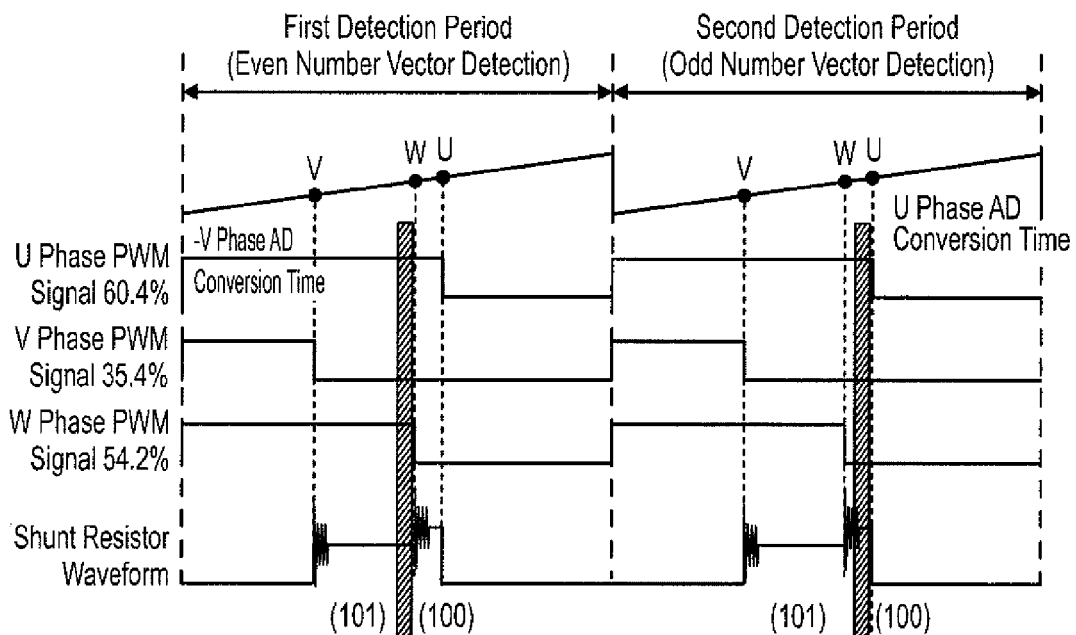
FIGS. 7A and 7B show a timing chart in a case where only an even number vector is detectable.

FIG. 7A shows a timing chart in a case where only the even number vector is detectable. In the first detection period (even number vector detection period), the switching time interval of the V phase (duty 35.4%) and the W phase (54.2%) is large. Thus, an accurate current value of the V phase can be detected in such time interval. In the second detection period (odd number vector detection period), the switching time interval of the U phase (60.4%) and the W phase (54.2%) is small. Thus, an accurate current value of the U phase cannot be detected in such time interval.

Figure 7B:
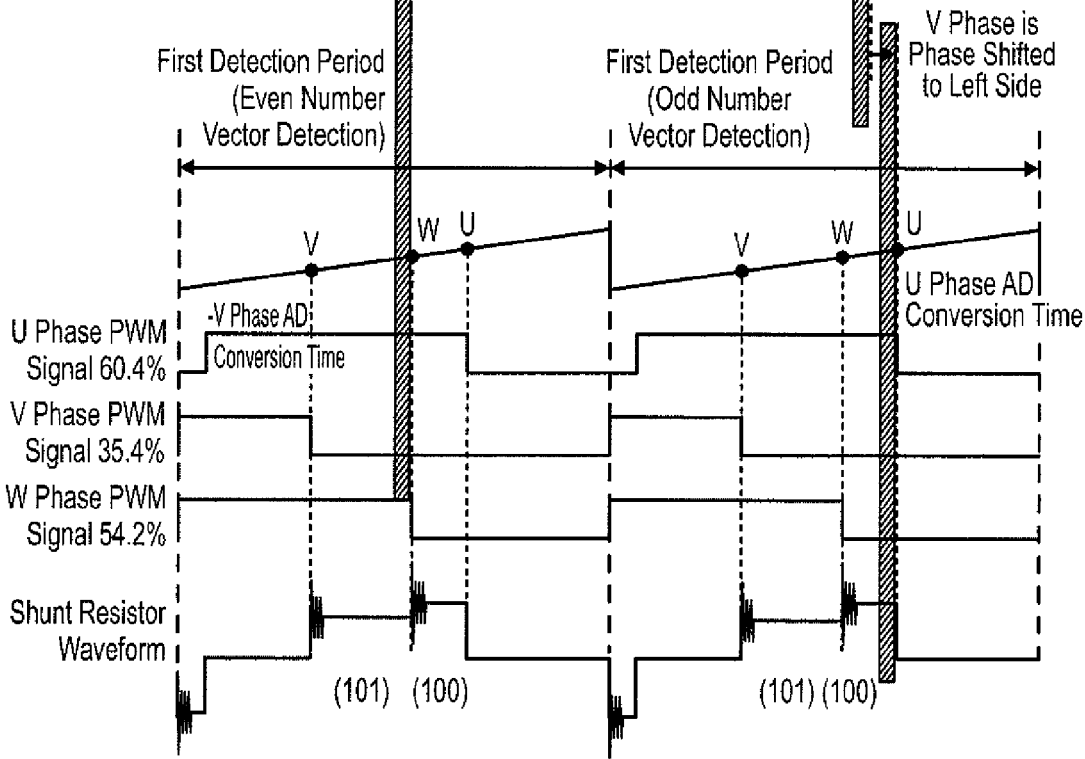

In other words, the PWM signal of the U phase having the maximum duty of the three phases is phase shifted to the right side (to delay the phase) as shown in FIG. 7B since an accurate current value of the U phase cannot be detected in a state of odd number vector, that is, in a state of (1, 0, 0) in this case. The switching time interval of the U phase and the W phase thereby becomes large. The accurate current value of the U phase then can be detected. In the first detection period (even number vector detection period), the switching time interval of the V phase and the W phase is large even after the phase shift of the U phase. Thus, an accurate current value of the V phase can be detected in such time interval.

In the case of the current detection of the V phase having the minimum Duty, the A/D conversion is performed from the time point where the current value is stabilized until immediately before the fall of the PWM signal of the Duty intermediate W phase after the fall of the PWM signal of the V phase during the first detection period (shaded portion on the left side). In the case of the current detection of the Duty maximum U phase, the A/D conversion is performed from the time point where the current value is stabilized until immediately before the fall of the PWM signal of the U phase after the fall of the PWM signal of the W phase during the second detection period (shaded portion on the right side).

Figure 8A:
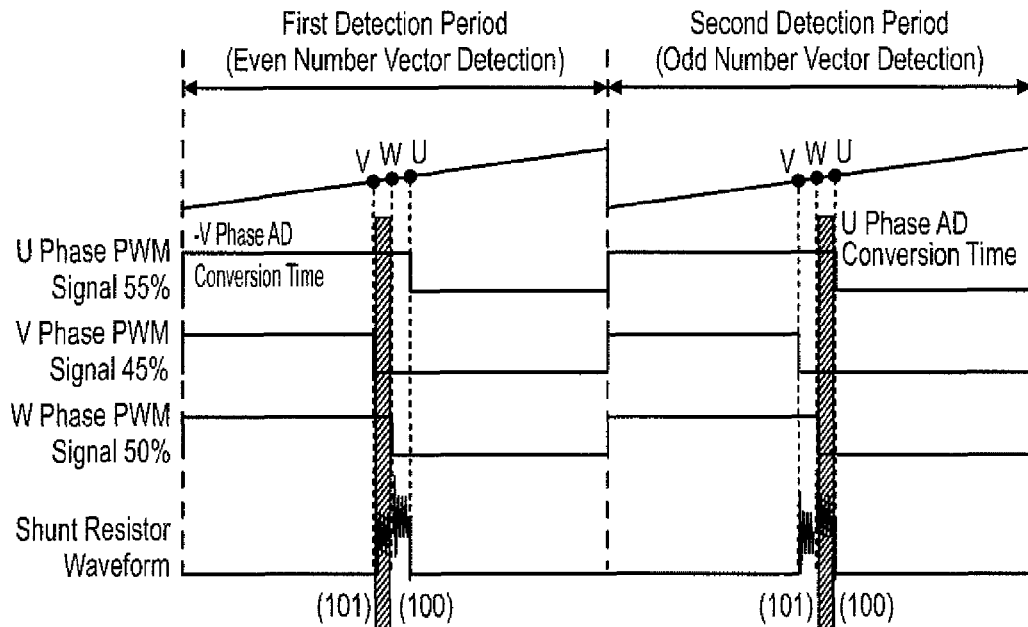
FIGS. 8A and 8B show a timing chart in a case where two phases are not detectable.

FIG. 8A shows a timing chart in a case where two phases are not detectable. In the first detection period (even number vector detection period), the switching time interval of the V phase (duty 45%) and the W phase (50%) is small. Thus, an accurate current value of the V phase cannot be detected in such time interval. In the second detection period (odd number vector detection period), the switching time interval of the U phase (55%) and the W phase (50%) is also small. Thus, an accurate current value of the U phase cannot be detected in such time interval.

Figure 8B:
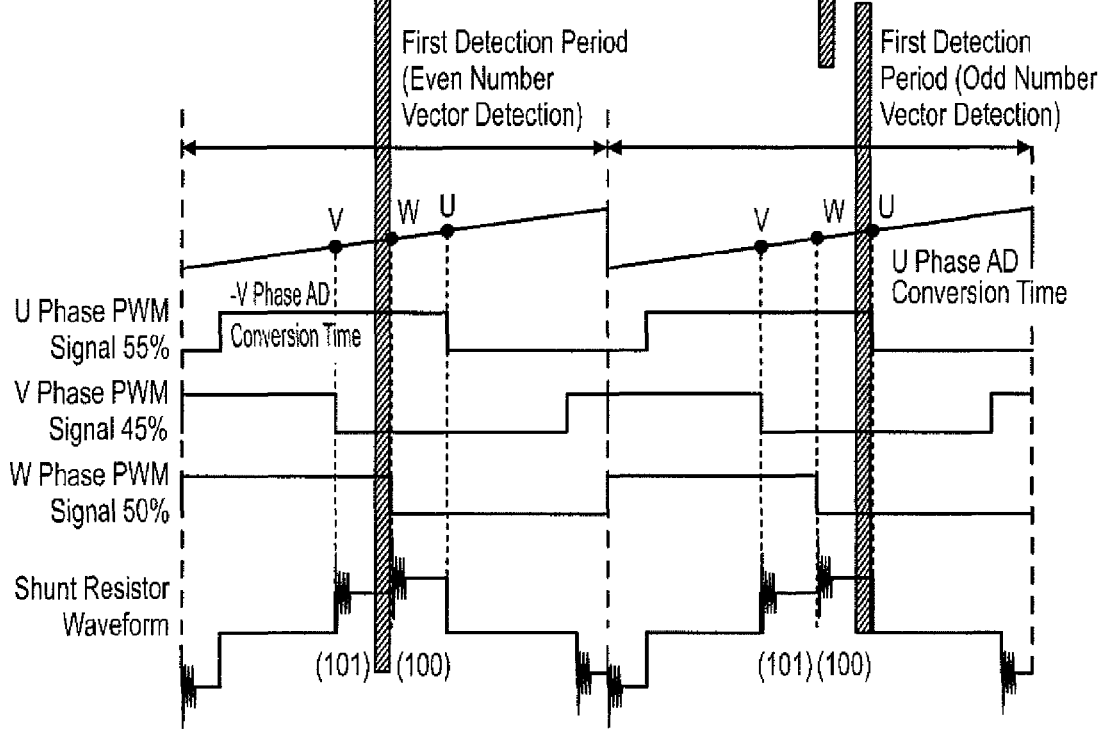

In other words, in the first detection period (even number vector detection period) of FIG. 8A, the PWM signal of the V phase having the minimum duty is phase shifted to the left side (to advance the phase) as shown in FIG. 8B since an accurate current value of the V phase cannot be detected in a state of even number vector, that is, in a state of (1, 0, 1) in this case. The switching time interval of the V phase and the W phase thereby becomes large. In the second detection period (odd number vector detection period) of FIG. 8A, the PWM signal of the U phase having the maximum duty is phase shifted to the right side (to delay the phase) as shown in FIG. 8B since an accurate current value of the U phase cannot be detected in a state of odd number vector, that is, in a state of (1, 0, 0) in this case. The switching time interval of the U phase and the W phase thereby becomes large. Therefore, the accurate current values of the U phase and the V phase can be eventually detected.

In the case of the current detection of the V phase having the minimum Duty, the A/D conversion is performed from the time point where the current value is stabilized until immediately before the fall of the PWM signal of Duty intermediate W phase after the fall of the PWM signal of the V phase during the first detection period (shaded portion on the left side). In the case of the current detection of the U phase having the maximum Duty, the A/D conversion is performed from the time point where the current value is stabilized until immediately before the fall of the PWM signal of the U phase after the fall of the PWM signal of the W phase during the second detection period (shaded portion on the right side).

A comparison regarding current ripple of the triangular signal and the saw-tooth signal is performed with respect to the carrier wave. The triangular signal has an advantage in that the current ripple is few compared to the saw-tooth signal. The reason is as described below. The PWM signal of one period is established from power running (when there is a difference in the ON/OFF state of each phase) and regeneration (when there is no difference in the ON/OFF state of each phase), but the current changes in the positive direction in power running. The current changes in the negative direction in regeneration. The slope of such change is determined by a time constant based on the inductance of the coil of the motor and the resistance of the coil of the motor.

Figure 9:
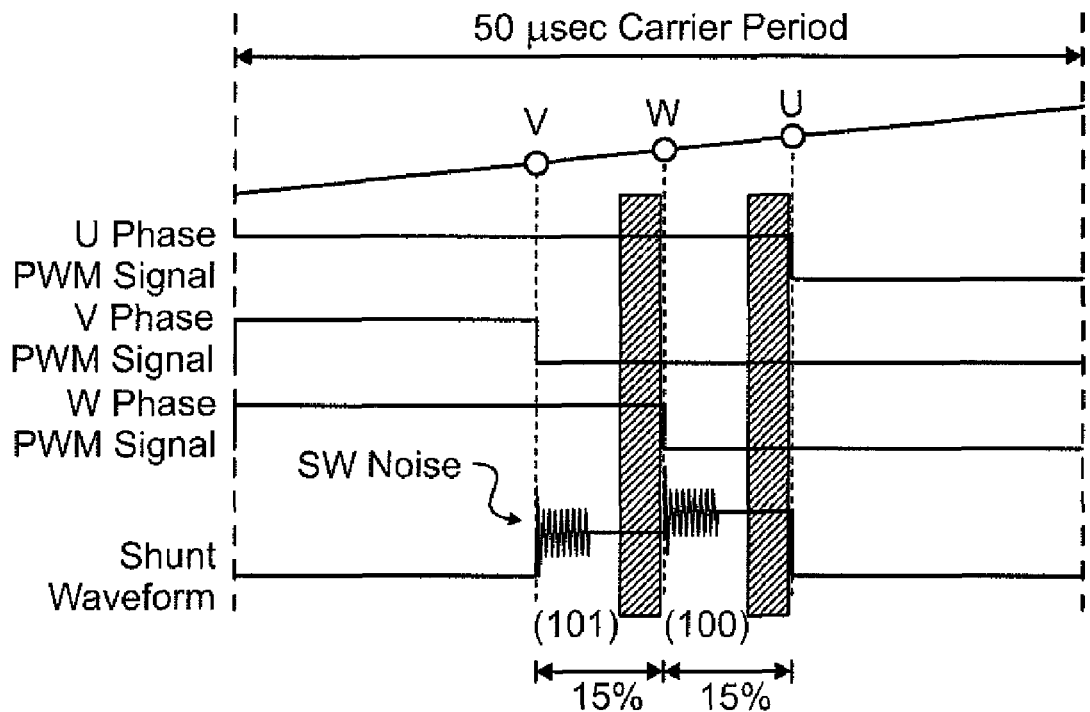
FIG. 9 shows a timing chart of the controller of the multi-phase electric motor according to the embodiment of the present invention.
Figure 10:
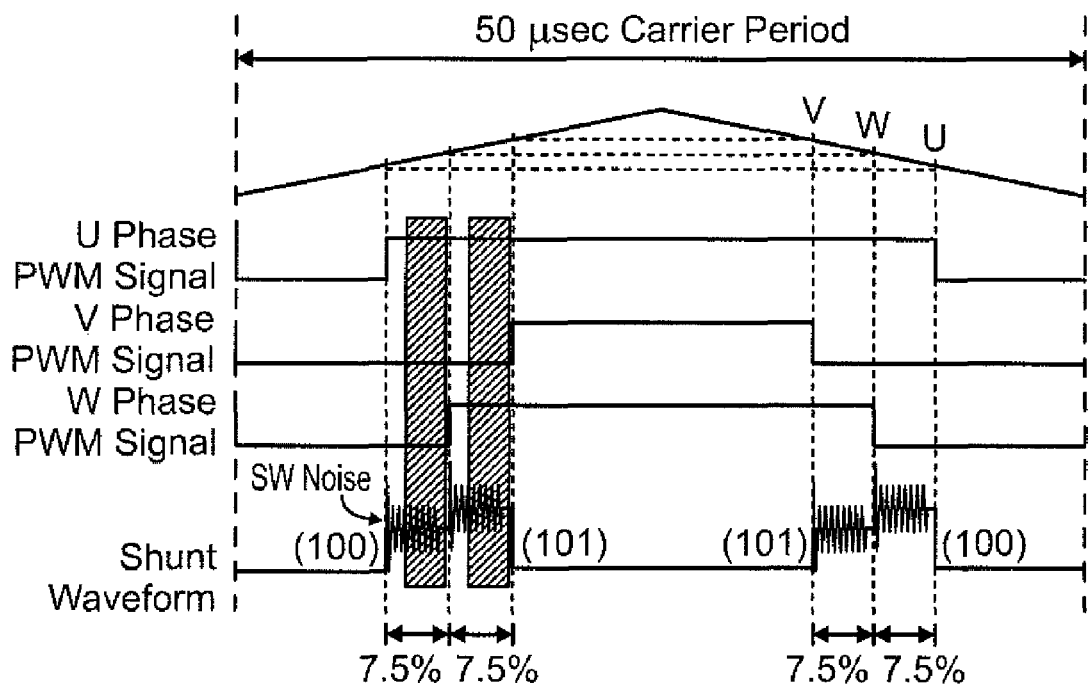
FIG. 10 shows a timing chart of the controller of the multi-phase electric motor when a triangular signal is used.

The current ripple is generated when the state changes from power running to regeneration, or from regeneration to power running. The rise time of the PWM signal of each phase is the same in the saw-tooth signal. For instance, the state change of the power running and the regeneration in the saw-tooth signal of FIG. 9 is regeneration→power running→regeneration. The rise time of the PWM signal of each signal differs in the triangular signal. The state change of the power running and the regeneration in the triangular signal of FIG. 10 is regeneration→power running→regeneration→power running→regeneration. Thus, the number of changes of the current in one period is larger when using the triangular signal.

Thus, when the triangular signal is used, the number of changes in one period is large. Therefore, the amount of change to positive/negative is small, and the current ripple becomes small. When using the saw-tooth signal, the number of changes in one period is small, and the amount of change to positive/negative is large. In other words, the current ripple is large. However, if the phase shift is applied to one phase or two phases as in one or more embodiments of the present invention, a situation where the rise time of the PWM signal of each phase differs becomes greater even when the saw-tooth signal is used, and as a result, an advantage in that the current ripple becomes small is obtained.

Figure 11:
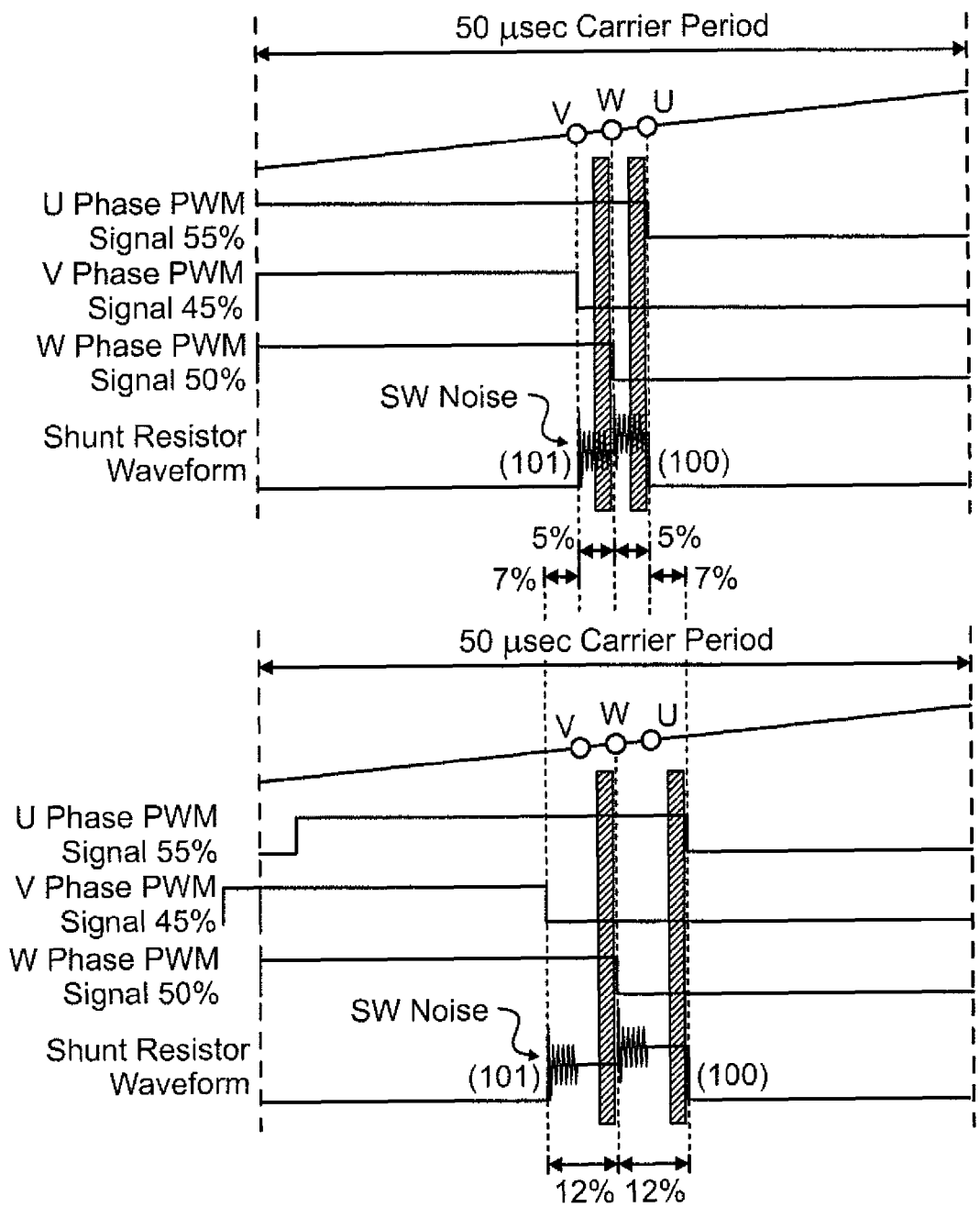
FIG. 11 shows a timing chart in a case where two phases of the controller of the multi-phase electric motor according to the embodiment of the present invention are not detectable.

FIG. 11 shows a timing chart of the controller of the multi-phase electric motor in a case where the saw-tooth signal is used. A case where the U phase PWM signal is duty 55%, the V phase PWM signal is duty 45%, and the W phase PWM signal is duty 50% in the carrier period of 50 μsec is shown in FIG. 11. The time interval between the V phase and the W phase (vector in this case is (1, 0, 1)), and between the W phase and the U phase (vector in this case is (1, 0, 0)) is 5%, that is short, and thus the switching noise does not fall within the shunt waveform of the relevant period, and the A/D conversion time for accurately detecting the current value cannot be ensured. The Duty difference (12%) necessary for detection can be ensured by shifting the U phase having the maximum duty to the right side by 7% and the V phase having the minimum duty to the left side by 7%.

Figure 12:
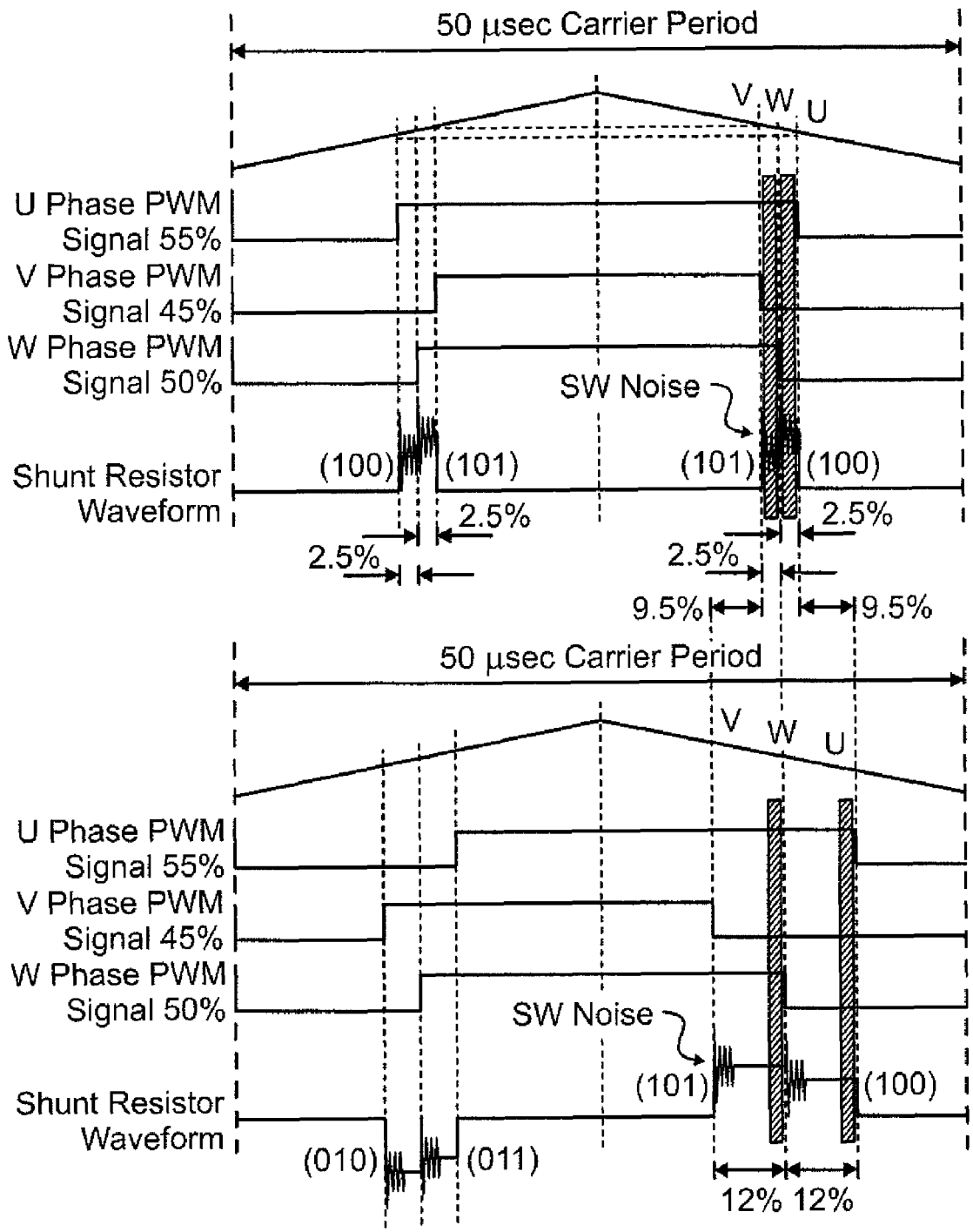
FIG. 12 shows a timing chart in a case where two phases of the controller of the multi-phase electric motor are not detectable when the triangular signal is used.

FIG. 12 shows a timing chart of the controller of the multi-phase electric motor in a case where the triangular signal is used. Similar to the case where the saw-tooth signal is used, a case where the U phase PWM signal is duty 55%, the V phase PWM signal is duty 45%, and the W phase PWM signal is duty 50% in the carrier period of 50 μsec is shown in FIG. 12. When the triangular wave is used, the time interval between the V phase and the W phase (vector in this case is (1, 0, 1)), and between the W phase and the U phase (vector in this case is (1, 0, 0)) is 2.5%, that is short since a phase difference is created on both sides. Therefore, the Duty difference (12%) necessary for detection cannot be ensured unless the U phase having the maximum duty is shifted to the right side by 9.5% and the V phase having the minimum duty to the left side by 9.5%. Since the PWM signal is symmetric in the triangular signal, the Duty difference (12%) necessary for detection can be ensured even by similarly shifting the U phase having the maximum duty to the left side by 9.5% and the V phase having the minimum duty to the right side by 9.5%. However, it is disadvantageous in that the shift amount increases by 9.5%−7%=2.5% compared to the saw-tooth signal.

Therefore, when the carrier wave is the saw-tooth signal, the length between the switching of the two phases is doubled compared to the case where the carrier wave is the triangular wave. Thus, compared to the triangular signal, an advantage is obtained in that there exist numerous three-phase PWM states in which the A/D conversion can be performed with the voltage waveform at both ends of the shunt resistor stabilized without performing the phase shift of the PWM signal.

In the present invention, various embodiments other than the above may be adopted. For instance, the FET is used for the upper arm switching element and the lower arm switching element in the above embodiment, but other switching element such as IGBT (Insulated Gate Bipolar mode Transistor) may be used. Furthermore, the current detection section may adopt a configuration other than that shown in the embodiment, and may be installed between the power supply and the FET bridge.

A brushless motor is described in the above embodiment as a multi-phase electric motor by way of example, but one or more embodiments of the present invention can be applied to the general controller for controlling the electric motor including a plurality of phases such as induction motor and synchronous motor.

What is claimed is:

1. A controller of a multi-phase electric motor comprising:
    a drive section, including a pair of upper arm switching element and a lower arm switching element, for driving the multi-phase electric motor;
    a single current detection section for detecting a current value of the multi-phase electric motor;
    a pulse width modulation signal generation section for generating a pulse width modulation signal of each phase based on the current value detected by the current detection section and a saw-tooth signal having a predetermined frequency;
    a current detectability determination section for determining whether or not the current value is detectable in the current detection section based on the pulse width modulation signal of each phase generated by the pulse width modulation signal generation section;
    a switching number determination section for determining whether or not conducting number of the upper arm switching element is an even number or an odd number based on the determination that the current is not detectable by the current detectability determination section;
    a phase movement section for moving a phase of the pulse width modulation signal of a predetermined phase generated by the pulse width modulation signal generation section based on the determination result of the switching number determination section and outputting to the drive section; and
    each phase current calculation section for calculating a current value of each phase based on the current value detected by the current detection section and the pulse width modulation signal of each phase generated by the pulse width modulation signal generation section.

2. The controller of the multi-phase electric motor according to claim 1, wherein the phase movement section moves the pulse width modulation signal of the predetermined phase in a predetermined movement direction by a predetermined amount when the switching number determination section determines as the even number, and moves the pulse width modulation signal of the predetermined phase in an opposite direction to the movement direction by a predetermined amount when the switching number determination section determines as the odd number.

3. The controller of the multi-phase electric motor according to claim 1, wherein the phase movement section moves, out of the pulse width modulation signals of respective phases, the phase of the pulse width modulation signal in which a magnitude of a duty is a maximum in a predetermined movement direction by a predetermined amount, and moves the phase of the pulse width modulation signal in which a magnitude of a duty is a minimum in an opposite direction to the movement direction.

* * * * *